United States Patent
Kranz et al.

(10) Patent No.: US 7,746,481 B2
(45) Date of Patent: Jun. 29, 2010

(54) METHOD FOR MEASURING CENTER OF ROTATION OF A NOZZLE OF A PICK AND PLACE MACHINE USING A COLLIMATED LASER BEAM

(75) Inventors: David M. Kranz, Minneapolis, MN (US); David W. Duquette, Minneapolis, MN (US); Matthew W. Dawson, St. Paul, MN (US)

(73) Assignee: CyberOptics Corporation, Golden Valley, MN (US)

( * ) Notice: Subject to any disclaimer, the term of this patent is extended or adjusted under 35 U.S.C. 154(b) by 86 days.

(21) Appl. No.: 12/051,961

(22) Filed: Mar. 20, 2008

(65) Prior Publication Data

US 2008/0231864 A1      Sep. 25, 2008

Related U.S. Application Data

(60) Provisional application No. 60/919,083, filed on Mar. 20, 2007.

(51) Int. Cl.
 *G01B 11/24* (2006.01)
(52) U.S. Cl. .................................................. 356/601
(58) Field of Classification Search ... 356/237.1–237.5, 356/601–608
 See application file for complete search history.

(56) References Cited

U.S. PATENT DOCUMENTS

| | | | |
|---|---|---|---|
| 3,337,941 A | 8/1967 | Drop et al. ..................... 29/203 |
| 3,487,226 A | 12/1969 | Yetter et al. .................. 250/222 |
| 3,622,396 A | 11/1971 | Fernandez et al. .......... 136/176 |
| 3,624,401 A | 11/1971 | Stoller .......................... 250/373 |
| 3,636,635 A | 1/1972 | Lemelson ..................... 33/174 |
| 3,764,813 A | 10/1973 | Clement et al. .......... 250/221 R |
| 3,781,115 A | 12/1973 | Rader et al. .................. 356/167 |
| 3,854,052 A | 12/1974 | Asar et al. .................... 250/560 |
| 3,876,877 A | 4/1975 | Wilhelmus et al. ....... 250/222 R |
| 3,888,362 A | 6/1975 | Fletcher et al. ............. 214/1 B |
| 3,905,705 A | 9/1975 | Petrohilos .................... 356/160 |

(Continued)

FOREIGN PATENT DOCUMENTS

DE  28 34 836  6/1979

(Continued)

OTHER PUBLICATIONS

Search report of European Patent Office in Patent Application PCT/US2008/003632 filed Mar. 20, 20008.

(Continued)

*Primary Examiner*—Tarifur R. Chowdhury
*Assistant Examiner*—Isiaka O Akanbi
(74) *Attorney, Agent, or Firm*—Christopher R. Christenson; Westman, Champlin & Kelly, P.A.

(57) ABSTRACT

A method of measuring and storing a center of rotation of a nozzle in a pick and place machine is provided. The method includes coupling an artifact to the nozzle. A substantially collimated laser beam is directed at the artifact, which is rotated while the collimated laser beam is energized. Edges of a shadow cast by the rotating artifact are detected and used to calculate error of a coordinate of the center of rotation of the nozzle. A coordinate of the center of rotation of the nozzle is calculated based upon a previous coordinate of the center of rotation and the error. The calculated coordinate of the center of rotation is stored for subsequent measurements.

12 Claims, 4 Drawing Sheets

U.S. PATENT DOCUMENTS

| | | | | |
|---|---|---|---|---|
| 4,074,938 A | 2/1978 | Taylor | | 356/160 |
| 4,144,449 A | 3/1979 | Funk et al. | | 250/221 |
| 4,151,945 A | 5/1979 | Ragard et al. | | 228/6 A |
| 4,247,767 A | 1/1981 | O'Brien et al. | | 250/221 |
| 4,312,109 A | 1/1982 | Kawana | | 29/564.6 |
| 4,346,293 A | 8/1982 | Fetzer | | 250/222 R |
| 4,383,359 A | 5/1983 | Suzuki et al. | | 29/712 |
| 4,405,233 A | 9/1983 | Grau | | 356/237 |
| 4,424,588 A | 1/1984 | Satoh et al. | | 382/48 |
| 4,456,378 A | 6/1984 | Goldowsky et al. | | 356/373 |
| 4,553,843 A | 11/1985 | Langley et al. | | 356/375 |
| 4,559,452 A | 12/1985 | Igaki et al. | | 250/560 |
| 4,585,350 A | 4/1986 | Pryor | | 356/625 |
| 4,598,456 A | 7/1986 | McConnell | | 29/407 |
| 4,615,093 A | 10/1986 | Tews et al. | | 29/407 |
| 4,628,464 A * | 12/1986 | McConnell | | 382/153 |
| 4,706,379 A | 11/1987 | Seno et al. | | 29/740 |
| 4,733,969 A | 3/1988 | Case et al. | | 356/375 |
| 4,741,621 A | 5/1988 | Taft et al. | | 356/376 |
| 4,747,198 A | 5/1988 | Asai et al. | | 29/407 |
| 4,776,088 A | 10/1988 | Biggs et al. | | 29/834 |
| 4,794,689 A | 1/1989 | Seno et al. | | 29/740 |
| 4,805,110 A | 2/1989 | Takahashi et al. | | 364/468 |
| 4,812,666 A | 3/1989 | Wistrand | | 250/561 |
| 4,881,319 A | 11/1989 | Yagi et al. | | 29/840 |
| 4,891,772 A | 1/1990 | Case et al. | | 364/562 |
| 4,905,370 A | 3/1990 | Hineno et al. | | 29/740 |
| 4,973,216 A | 11/1990 | Domm | | 414/744.5 |
| 5,005,978 A | 4/1991 | Skunes et al. | | 356/372 |
| 5,012,115 A | 4/1991 | Asai et al. | | 250/561 |
| 5,030,839 A | 7/1991 | van de Stadt | | 250/561 |
| 5,035,047 A | 7/1991 | Harigane et al. | | 29/740 |
| 5,039,210 A | 8/1991 | Welstead et al. | | 359/36 |
| 5,040,291 A | 8/1991 | Janisiewicz et al. | | 29/840 |
| 5,046,851 A | 9/1991 | Morgan | | 356/375 |
| 5,060,366 A | 10/1991 | Asai | | 29/739 |
| 5,088,187 A | 2/1992 | Takata et al. | | 29/705 |
| 5,114,229 A | 5/1992 | Hideshima | | 356/237 |
| 5,114,230 A | 5/1992 | Pryor | | 356/372 |
| 5,131,139 A | 7/1992 | Oyama et al. | | 29/721 |
| 5,162,866 A | 11/1992 | Tomiya et al. | | 356/375 |
| 5,260,791 A | 11/1993 | Lubin | | 358/160 |
| 5,278,634 A | 1/1994 | Skunes et al. | | 356/400 |
| 5,293,048 A | 3/1994 | Skunes et al. | | 250/561 |
| 5,309,223 A | 5/1994 | Konicek et al. | | 356/375 |
| 5,331,406 A | 7/1994 | Fishbaine et al. | | 356/375 |
| 5,377,405 A | 1/1995 | Sakurai et al. | | 29/833 |
| 5,384,956 A | 1/1995 | Sakurai et al. | | 29/834 |
| 5,455,870 A | 10/1995 | Sepai et al. | | 382/147 |
| 5,467,186 A | 11/1995 | Indo et al. | | 356/150 |
| 5,471,310 A | 11/1995 | Spigarelli et al. | | 356/399 |
| 5,493,391 A | 2/1996 | Neal et al. | | 356/121 |
| 5,493,403 A | 2/1996 | Nishi | | 356/401 |
| 5,559,727 A * | 9/1996 | Deley et al. | | 700/297 |
| 5,566,447 A | 10/1996 | Sakurai | | 295/832 |
| 5,570,993 A | 11/1996 | Onodera et al. | | 414/783 |
| 5,608,642 A | 3/1997 | Onodera | | 364/478.01 |
| 5,619,328 A | 4/1997 | Sakurai | | 356/375 |
| 5,619,528 A | 4/1997 | Rebec et al. | | 375/219 |
| 5,660,519 A | 8/1997 | Ohta et al. | | 414/783 |
| 5,739,525 A | 4/1998 | Greve | | 250/227.11 |
| 5,745,241 A | 4/1998 | Hashimoto | | 356/384 |
| 5,749,142 A | 5/1998 | Hanamura | | 29/833 |
| 5,897,611 A * | 4/1999 | Case et al. | | 702/150 |
| 5,900,940 A * | 5/1999 | Aoshima | | 356/614 |
| 5,901,241 A | 5/1999 | Koljonen et al. | | 382/150 |
| 5,956,149 A | 9/1999 | Suzuki et al. | | 356/378 |
| 6,031,242 A | 2/2000 | Hudson | | 250/548 |
| 6,100,922 A | 8/2000 | Honda et al. | | 348/86 |
| 6,118,538 A | 9/2000 | Haugan et al. | | 356/375 |
| 6,195,165 B1 | 2/2001 | Sayegh | | 356/376 |
| 6,400,459 B1 | 6/2002 | Haugan et al. | | 356/614 |
| 6,490,048 B1 | 12/2002 | Rudd et al. | | 356/601 |
| RE38,025 E | 3/2003 | Skunes et al. | | 356/400 |
| 6,583,884 B2 * | 6/2003 | Rudd et al. | | 356/601 |

FOREIGN PATENT DOCUMENTS

| | | |
|---|---|---|
| DE | 30 22 803 | 4/1981 |
| EP | 062335 | 10/1982 |
| EP | 144717 | 6/1985 |
| EP | 0293175 A3 | 5/1988 |
| EP | 0374848 A3 | 12/1989 |
| EP | 0582086 | 7/1993 |
| EP | 0582171 | 2/1994 |
| GB | 2183820 | 6/1987 |
| JP | 57-017804 | 1/1982 |
| JP | 60-183507 | 9/1985 |
| JP | 60-189951 | 9/1985 |
| JP | 61-225604 | 10/1986 |
| JP | 62-008006 | 1/1987 |
| JP | 62-263405 | 11/1987 |
| JP | 62-288504 | 12/1987 |
| JP | 63-202096 | 8/1988 |
| JP | 63249018 | 10/1988 |
| JP | 63-283100 | 11/1988 |
| JP | 63-299400 | 12/1988 |
| JP | 2059231 | 2/1990 |
| JP | 2062099 | 3/1990 |
| JP | 2303751 | 12/1990 |
| JP | 3045919 | 2/1991 |
| JP | 3115538 | 5/1991 |
| JP | 4322924 | 11/1992 |
| JP | 6104596 | 4/1994 |
| JP | 6249629 | 9/1994 |
| JP | 11040991 | 2/1999 |
| JP | 11040992 | 2/1999 |
| JP | 11068397 | 3/1999 |
| JP | 11068398 | 3/1999 |
| JP | 2000 088522 | 3/2000 |
| JP | 2000 180141 | 6/2000 |
| JP | 2001-230597 | 8/2001 |
| SU | 1370456 | 1/1988 |
| WO | WO 99/49713 | 9/1999 |
| WO | WO 01/74127 A1 | 10/2001 |
| WO | WO 2007/033349 A1 | 3/2007 |

OTHER PUBLICATIONS

"New Trends in SMD Pick & Place Machines Put High Demands on Vision Systems," IECON '90, 16$^{th}$ Annual Conference of IEEE Industrial Electronics Society, Nov. 27-30, 1990, p. 799-804.

Sanderson, Arthur C. et al., "Sensor-Based Robotic Assembly Systems: Research and Applications in Electronic Manufacturing," Proceedings of the IEEE, vol. 71, No. 7, Jul. 1983, p. 856-871.

Case, Steven K., "Laser Vision Adds Precision and Speed to Component Placement Machines," presented at NEPCON West '93, 1993, 16 pages.

Weissmantel, H., "Montage mit Robotern," VFDI-Berichte Nr. 460, 1982, pp. 63-68.

Samsung Electronics Product Literature Brochure, Jan. 2001, 2 pages.

\* cited by examiner

METHOD FOR MEASURING CENTER OF ROTATION OF A NOZZLE OF A PICK AND PLACE MACHINE USING A COLLIMATED LASER BEAM

CROSS-REFERENCE TO RELATED APPLICATION

The present application is based on and claims the benefit of U.S. provisional patent application Ser. No. 60/919,083, filed Mar. 20, 2007, the content of which is hereby incorporated by reference in its entirety.

BACKGROUND

Pick and place machines are generally used to manufacture electronic circuit boards. A blank printed circuit board is usually supplied to the pick and place machine, which then picks individual electronic components from component feeders, and places such components upon the board. The components are held upon the board temporarily by solder paste, or adhesive, until a subsequent step in which the solder paste is melted or the adhesive is fully cured. The individual electronic components must be placed precisely on the circuit board in order to ensure proper electrical contact, thus requiring correct angular orientation and lateral positioning of the component upon the board.

Pick and place machine operation is challenging. In order to drive the cost of the manufactured circuit board down, the machine must operate quickly to maximize the number of components placed per hour. However, as the state-of-the-art of the electronics industry has advanced, the sizes of the components have decreased and the density of interconnections has increased. Accordingly, the acceptable tolerance on component placement has decreased markedly. Actual pick and place machine operation often requires a compromise in speed to achieve an acceptable level of placement accuracy.

One way in which pick and place machine operation is efficiently sped up is in the utilization of a sensor that is able to accurately evaluate both the position and angular orientation of a picked component upon a nozzle or vacuum quill, while the component is in transit to the placement site. Such sensors essentially allow the task of determining the component position and orientation upon the vacuum quill to be performed without any impact on placement machine speed, unlike systems that require separate motion to a fixed alignment sensor. Such sensors are known, and are commercially available from CyberOptics Corporation, of Golden Valley, Minn., under the trade designation Model LNC-60. Several aspects of these sensors are described in U.S. Pat. Nos. 5,278, 634; 6,490,048; and 6,583,884.

These laser-based alignment sensors are used in pick and place machines to measure the offset (X, Y and θ) and size (Sx, Sy) of picked components. Laser-based alignment sensors generally transmit the measured offset values to the pick and place machine controller, so that the controller of the machine can correct for the offset and accurately place the component upon the circuit board at the placement site. Additionally, the part size (Sx, Sy) features are also measured and transmitted to the pick and place machine allowing the pick and place machine to detect incorrect part size, or other problems.

Increasing the capability of such a sensor is a significant benefit to the art of electronics assembly. In particular, it is desirable to provide very large measurement area in a compact sensor volume to allow accurate alignment of multiple components in parallel. These sensors rely on precise characterization of the measurement geometry.

SUMMARY

A method of measuring and storing a center of rotation of a nozzle in a pick and place machine is provided. The method includes coupling an artifact to the nozzle. A substantially collimated laser beam is directed at the artifact, which is rotated while the collimated laser beam is energized. Edges of a shadow cast by the rotating artifact are detected and used to calculate error of a coordinate of the center of rotation of the nozzle. A coordinate of the center of rotation of the nozzle is calculated based upon a previous coordinate of the center of rotation and the error. The calculated coordinate of the center of rotation is stored for subsequent measurements.

DETAILED DESCRIPTION OF ILLUSTRATIVE EMBODIMENTS

Some commercially-available laser-based alignment sensors, such as the LNC 60 laser-based alignment sensor available from CyberOptics, assumes a nominal Center of Rotation (COR) for the component rotation axis. The COR is represented by Cartesian coordinates ($X_{COR}$, $Y_{COR}$) where the rotation axis intersects the sensor's x-y reference plane. When the sensor is attached to the placement head of the pick and place machine, the actual COR is not identical to the nominal COR due to mechanical tolerances of the placement machine. When the sensor is programmed with only the nominal COR, the sensor will measure the part with some error. In order to minimize the error, it is necessary to find the actual COR and for it to be programmed into the sensor prior to the measurement of a part. Additionally, with variations that occur during operation, such as from machine wear, faults, etc., the previously-programmed COR may not continue to be correct.

Embodiments of the present invention generally provide a laser-based alignment sensor with the ability to automatically measure a Center of Rotation and update the value, either within the sensor, or within the controller of the pick and place machine. This automatic measurement can be performed when the sensor is first installed and can be periodically performed during operation.

Commercially available laser-based alignment sensors have the ability to perform measurements in a two-edge or a single-edge mode. In the two-edge mode, a measurement is made using data collected from both left and right shadow edges. In the single-edge mode, only one of the shadow edges, left or right is used to compute a measurement. In the single-edge measurement mode, error (E) between the assumed Center of Rotation (COR) and the true Center of Rotation (COR) adds a bias to the size measurement that is proportional to E. More precisely, the size bias is equal to twice the component of E in the direction normal to the light ray defining the edge of the component. Because the laser beam in at least some commercially available-laser-based alignment sensors is nearly collimated, the right edge and left edge measurements will produce a bias with substantially the same magnitude, but opposite signs. Embodiments of the present invention generally leverage this property to determine true Center of Rotation within a sufficiently small error.

Figure 1:
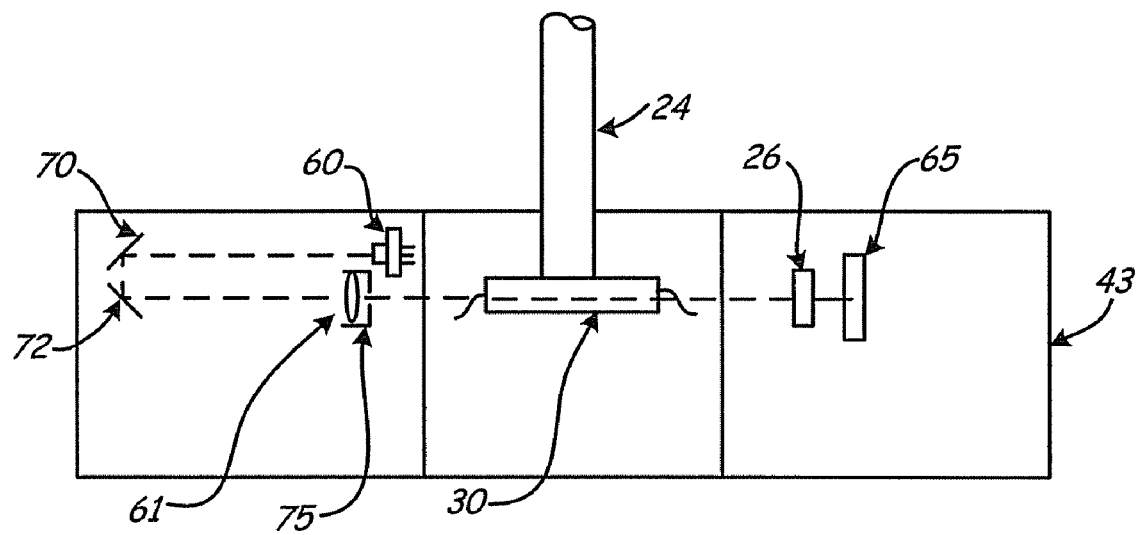
FIG. 1 is an elevation view illustrating a diagrammatic alignment sensor with which embodiments of the present invention are particularly useful.
Figure 2:
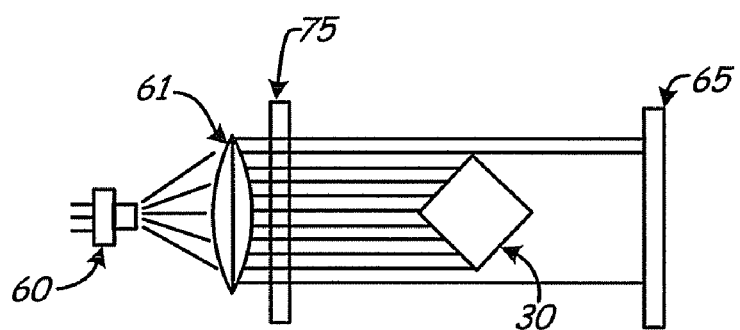
FIG. 2 is a plan view illustrating a diagrammatic laser-based alignment sensor with which embodiments of the present invention are particularly useful.

FIGS. 1 and 2 are elevation and plan views illustrating a diagrammatic laser-based alignment sensor with which embodiments of the present invention are particularly useful. One or more vacuum quills or nozzles 24 are used to pick up components, such as component 30, from a feeder, such as a tape feeder, and move the component 30 to a placement location upon a circuit board. While component 30 is undergoing the relative motion to its placement site, sensor 43 is able to determine both the location of component 30 upon vacuum quill 24, as well as the rotational orientation of component 30 upon vacuum quill 24. In the example illustrated in FIGS. 1 and 2, a source of monochromatic illumination, such as laser diode 60, directs illumination away from part 30. Two reflecting mirrors 70, 72, direct the laser light beam through collimating lens 61, and slit aperture 75, past electronic component 30 with that portion of the laser beam or stripe which passes the edge of component 30 being filtered by optical filter 26 to strike linear CCD array 65, which then provides data to be processed for angular orientation and x, y location. While the illumination is energized, vacuum quill 24, and accordingly, component 30, are rotated and the corresponding movement of shadows upon linear CCD array 65 are used to calculate the angular orientation and x, y location.

In accordance with an embodiment of the present invention, the true Center of Rotation of nozzle 24 is measured by the sensor. Initially, the sensor is programmed with a nominal position; $COR_{programmed}=(X_{COR}, Y_{COR})=(0, 0)$. The pick and place machine then picks up a round artifact, the diameter of which is known, and is small enough to allow both the left and right edge measurements to be performed. Two single-edge measurements of this round artifact are performed: a right edge-only measurement, and a left edge-only measurement. The Center of Rotation (COR) error vector, E, is defined by the following equation:

$$E = COR_{programmed} - COR_{true}$$

The component of the error vector (E) normal to the beam ray, $E_x$, produces the size bias. In order to measure the component size without bias, it is important to eliminate, or minimize, $E_x$ by programming the sensor with the correct value for the x-coordinate for the Center of Rotation. The sensor design has the properties that the beam is nearly collimated and that the beam ray normal angle is within a few degrees of the sensor x-axis. As a consequence, the component of the Center of Rotation in the direction parallel to the beam, $E_y$, has very little effect on the measurement and can thus be neglected.

In accordance with an embodiment of the present invention, the algorithms and methods performed by laser-based alignment sensors process the data collected from the round artifact to compute three results: the offset coordinates (X, Y) of the center of the round part with respect to the Center of Rotation and the diameter (D). The Center of Rotation error will introduce a bias in D of $+2E_x$ for the left edge-only measurement and $-2E_x$ for the right edge-only measurement.

$$D_{left} = D_{true} + 2E_x;$$

$$D_{right} = D_{true} - 2E_x$$

Figure 3:
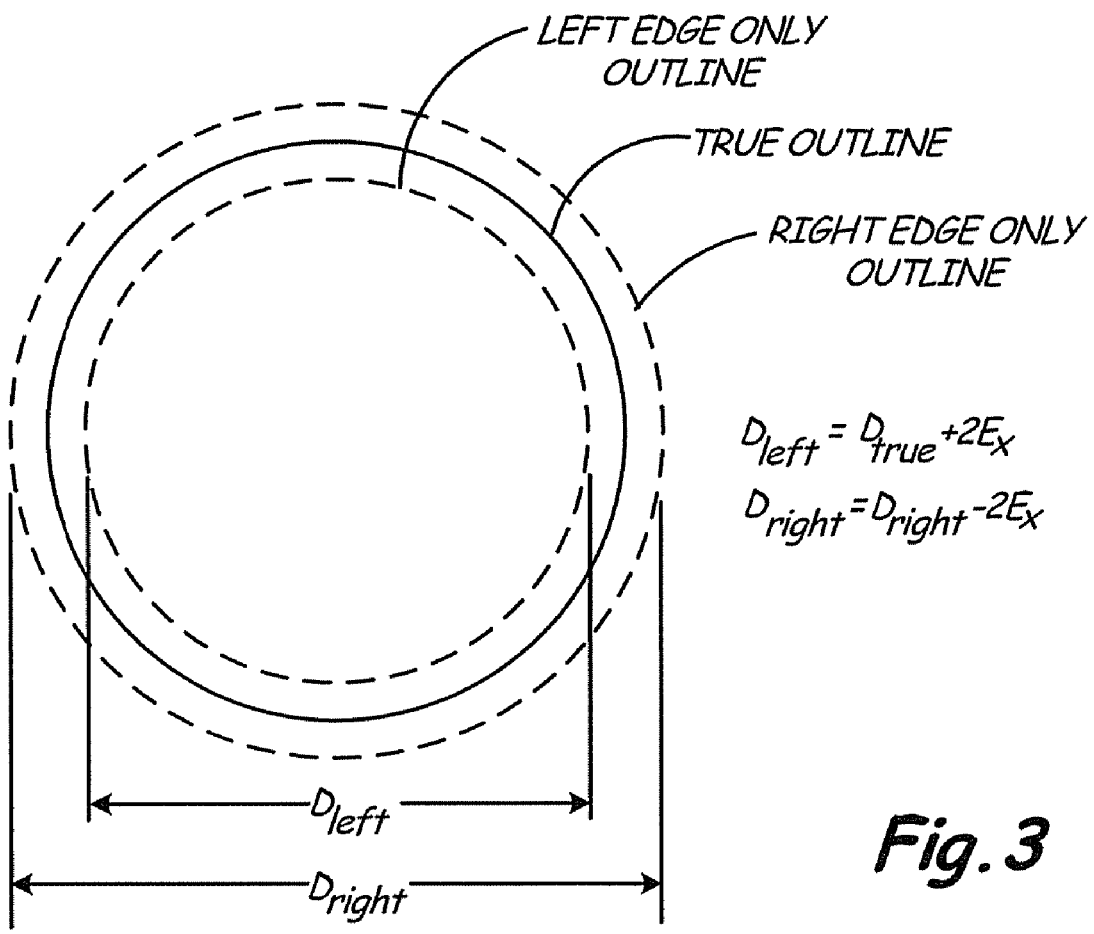
FIG. 3 is a diagrammatic view illustrating error in diameter measurement of a round artifact in accordance with an embodiment of the present invention.

This relationship is illustrated in FIG. 3. The pick and place machine uses the equation $E_x=(D_{left}-D_{right})/4$ to compute $E_x$. From this, the pick and place machine computes the true value of the x-coordinate of the Center of Rotation:

$$X_{COR,true} = X_{COR,programmed} - E_x.$$

Since the beam is not perfectly collimated, the bias from the left edge-only and right edge-only measurements are not exactly equal. This results in a small residual error after using the procedure. Accordingly, a preferred embodiment of the present invention is to iterate, thus performing the procedure repeatedly until E is sufficiently small for the application, such as 0.002 millimeters. This would be accomplished within one or two iterations.

Figure 4:
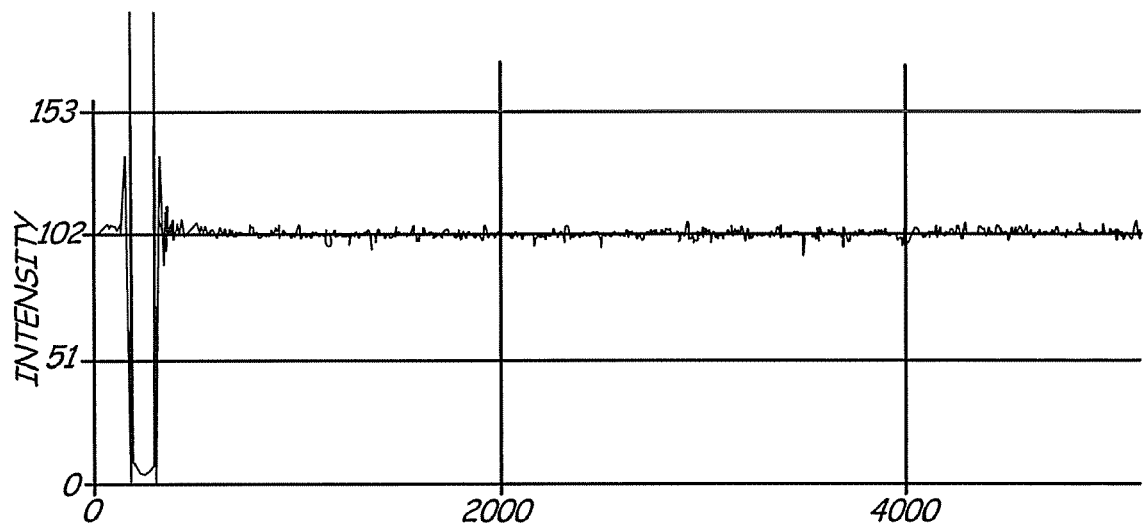
FIG. 4 is a diagrammatic view of the intensity of a shadow cast by a round artifact where the left and right shadow edges are indicate by vertical bars.

FIG. 4 is a diagrammatic view of the intensity of a shadow cast by a 1.0 millimeter round artifact where the left and right shadow edges are indicated by vertical bars.

Figure 5:
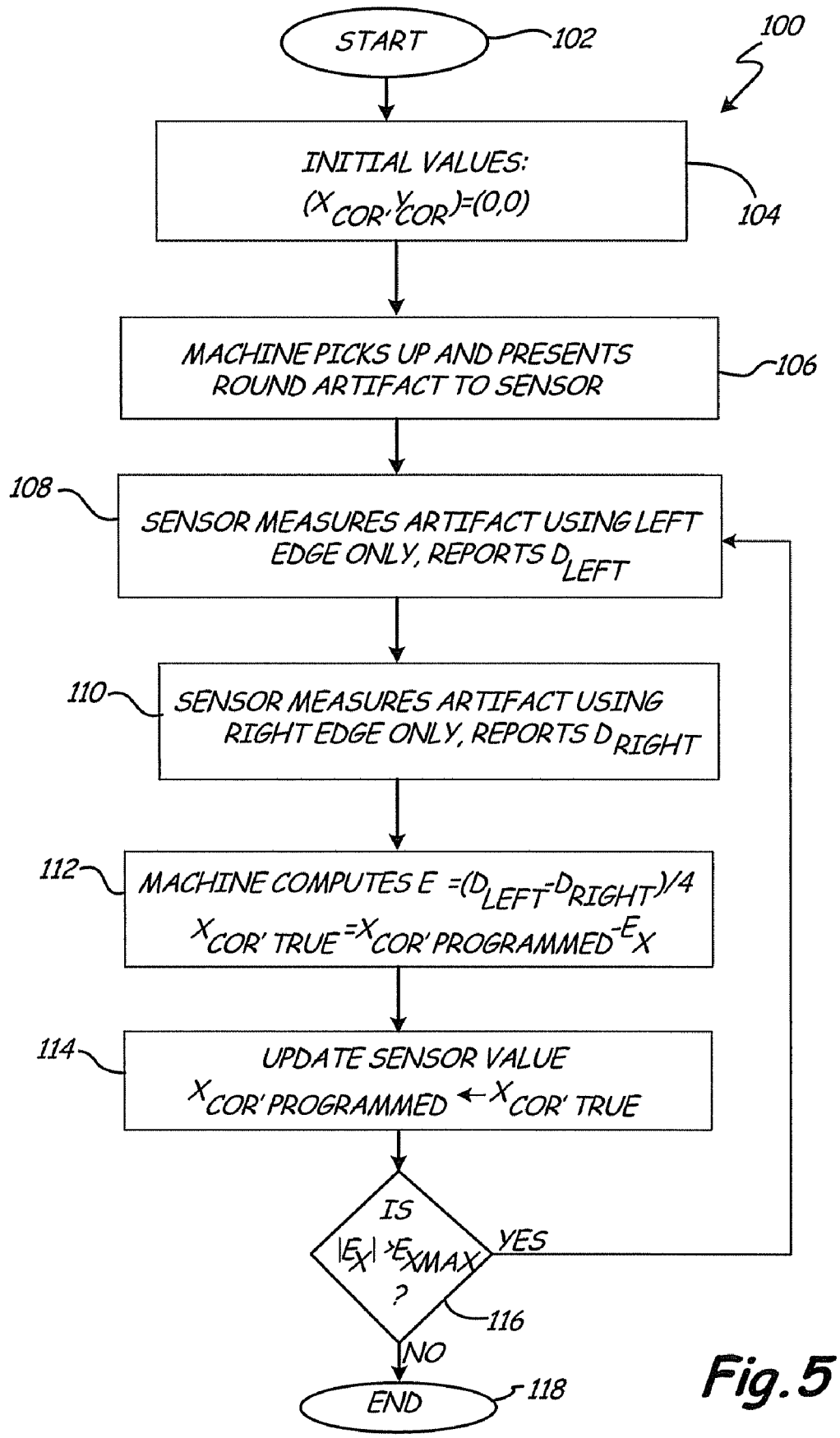
FIG. 5 is a flow diagram of a method of calculating a Center of Rotation of a nozzle of a pick and place machine in accordance with an embodiment of the present invention.

FIG. 5 is a flow diagram of a method of calculating a Center of Rotation of a nozzle of a pick and place machine in accordance with an embodiment of the present invention. Method 100 begins at block 102 and continues to block 104 where initial values for the Center of Rotation are arbitrarily set. This is preferably done programmatically by a technician, or other suitable entity, such as a manufacturer, entering zeros for both the X-coordinate Center of Rotation ($X_{COR}$) and the Y-coordinate Center of Rotation ($Y_{COR}$). Method 100 continues at block 106 where the pick and place machine picks up an artifact designed to facilitate Center of Rotation calculation. Preferably this artifact has a circular shape, but any suitable shape can be used. At block 108, the sensor measures the artifact using only the left edge-only measurement and reports the value obtained as $D_{left}$. Next, at block 110, the sensor measures the artifact using a right edge-only measurement, and reports $D_{right}$. At block 112, the pick and place machine, or the sensor, computes the error in the x coordinate ($E_x$) as:

$$E_x = (D_{left} - D_{right})/4.$$

Additionally, the x coordinate of the true Center of Rotation is calculated ($X_{COR,true}) = X_{COR,programmed} - E_x$. Next, at block 114, the Center of Rotation value for the x coordinate is updated from the previous value, such as 0, to the newly calculated value, $X_{COR,true}$. At block 116, the absolute value of the error in the x coordinate ($|E_x|$) is checked to see if it is greater than a threshold ($E_{x,max}$) in the x direction. If the absolute value is greater than the threshold, the method iterates by returning from block 116 to block 108. However, if the error is equal to or less than the selected threshold, then method 100 exits via block 118.

Although the present invention has been described with reference to preferred embodiments, workers skilled in the art will recognize that changes may be made in form and detail without departing from the spirit and scope of the invention. For example, while embodiments of the present invention have generally been described with respect to calculating a center of rotation of a single nozzle, any suitable number of nozzles within the illumination field of the collimated laser can have their centers of rotation calculated, as long as each nozzle is calculated separately from the others. Thus, the round artifact would only be coupled to a single nozzle at a time.

What is claimed is:

1. A method of measuring a center of rotation of a nozzle in a pick and place machine, the method comprising:
   coupling an artifact to the nozzle;
   directing a substantially collimated laser beam at the artifact;
   rotating the artifact while the collimated laser beam is energized;
   detecting edges of a shadow cast by the rotating artifact;
   calculating error of a coordinate of the center of rotation of the nozzle using the detected edges;
   calculating a coordinate of the center of rotation of the nozzle based upon a previous coordinate of the center of rotation and the error; and
   storing the calculated coordinate of the center of rotation for subsequent measurements.

2. The method of claim 1, wherein the artifact is round.

3. The method of claim 2, wherein the dimension is the diameter of the artifact.

4. The method of claim 1, wherein the calculated coordinate is an x-axis coordinate, normal to a direction of the collimated laser beam.

5. The method of claim 4, wherein the method is performed iteratively until the calculated error is below a selected threshold.

6. The method of claim 5, wherein the selected threshold is 0.002 millimeters.

7. The method of claim 4, wherein the method is repeated.

8. The method of claim 1, wherein the calculated coordinate of the center of rotation is stored in a controller of a pick and place machine.

9. The method of claim 1, wherein the calculated coordinate of the center of rotation is stored in an alignment sensor.

10. The method of claim 1, wherein the previous coordinate is 0.

11. The method of claim 1, wherein the method is performed periodically.

12. The method of claim 1, wherein the method is performed when an alignment sensor is coupled to a placement head of the pick and place machine.

* * * * *